May 17, 1938.  W. F. EAMES  2,117,875
CONTROL SYSTEM
Filed Dec. 24, 1935   2 Sheets—Sheet 1
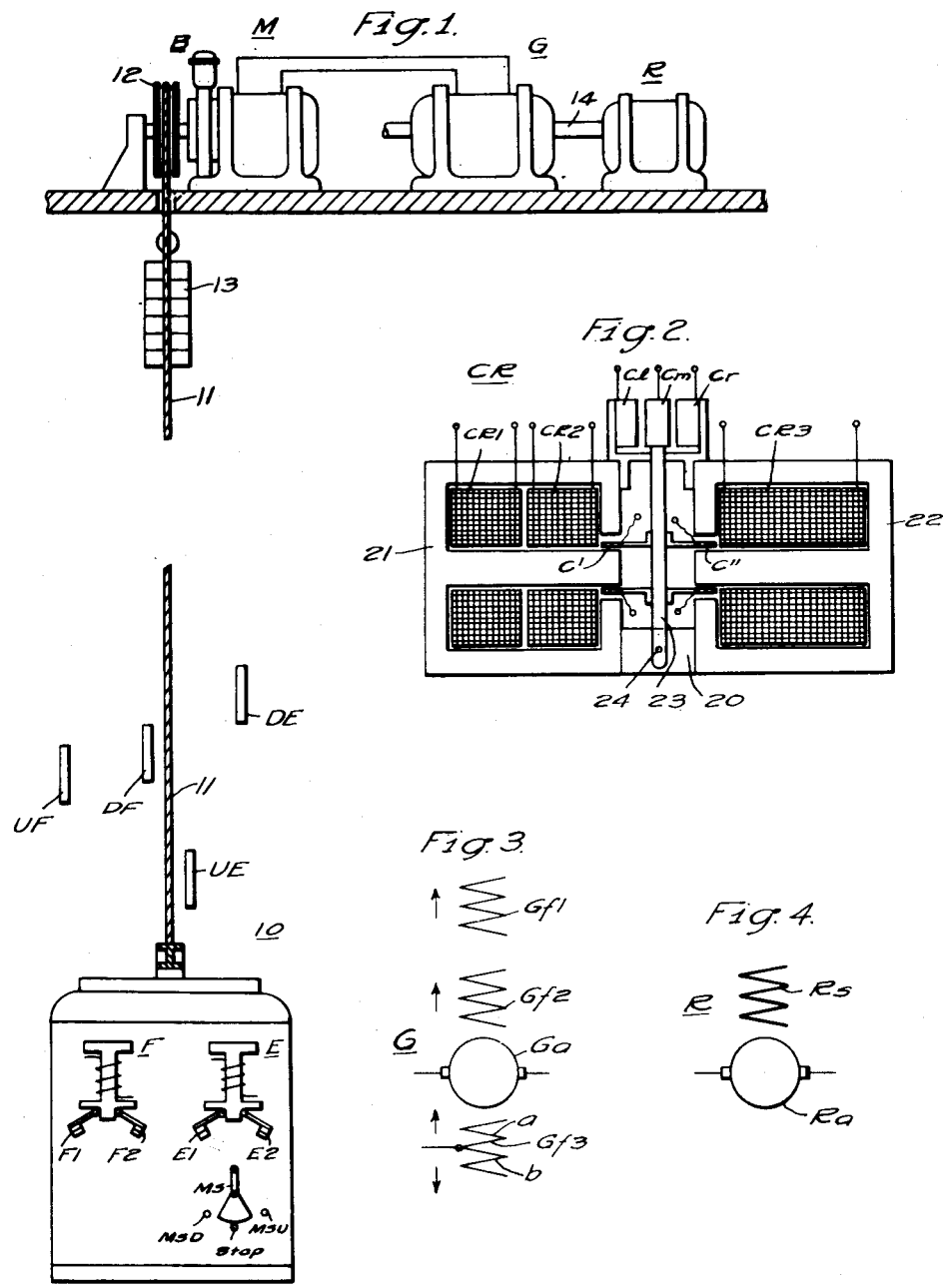
WITNESSES:
INVENTOR
William F. Eames.
BY
ATTORNEY INVENTOR
William F. Eames.

Patented May 17, 1938

2,117,875

UNITED STATES PATENT OFFICE 2,117,875

CONTROL SYSTEM

William F. Eames, Pittsburgh, Pa., assignor to Westinghouse Electric Elevator Company, Chicago, Ill., a corporation of Illinois Application December 24, 1935, Serial No. 56,007

15 Claims. (Cl. 172—239)

My invention relates generally to electrical control systems and it has particular relation to a system which may be employed for controlling the functioning of a generator field or Ward-Leonard control system as applied to elevators.

In a generator field or Ward-Leonard control system for operating elevator cars, a motor is provided which is operatively connected to move a car in the hatchway. The armature of the motor is connected in loop circuit to the armature of the generator. The field structure of the motor is energized from a separate source of excitation which, in many instances, may be a constant source of energization. In order to vary the speed at which the motor operates and to reverse its direction of rotation, the flux in the field structure of the generator is varied and is reversed.

As the current increases in the loop circuit connecting the armatures of motor and generator, there is a corresponding increase in the voltage drop due to the resistance of the circuit. In order to compensate for this resistance drop, a series field winding has been provided in the past on the field structure of the generator. The generator flux is then modified as a function of the loop circuit current, and, as a result, a compounding action to a certain degree takes place so that the voltage at the motor terminals may be more nearly constant than would otherwise be the case.

When a series field winding is employed, it is adjusted to take care of average or normal conditions in the loop circuit. In the event that a condition occurs which tends to upset these normal conditions, then the corrective effect introduced by the series field winding is not such as to afford the required corrective action. The changes in the conditions from the normal or average conditions are caused by change in resistance of the conductors forming the loop circuit due to a temperature rise therein. Further departures from the average or normal conditions are caused by changes in brush drop at the commutator of either the motor or generator or both. The wear on one or both of the commutators of the machines also introduces another variable factor. As the commutators wear, they may introduce differences in the resistance of the conductors forming the loop circuit due to high mica between the bars of the commutator. In addition, certain variations are also caused by changes in resistance of the field windings of the generator and motor due to increase in temperature.

The speed of the motor is varied as set forth by changing the flux present in the field structure of the generator. This change is effected by altering the flow of current through one of the field windings of the generator by means of a controller. Ordinarily, the controller will be provided with several steps by means of which changes in speed may be effected. At each step of the controller there is a predetermined speed at which the motor should run. Any departures from the various speeds corresponding to the different points of the controller may cause the elevator car to operate improperly, particularly when the deceleration period is considered preparatory to stopping the elevator car at a floor.

The object of my invention, generally stated, is to provide a control system for a direct-current generator used in a Ward-Leonard or generator field control system which shall be simple and efficient in operation and which may be readily and economically manufactured and installed.

The principal object of my invention is to provide for maintaining the voltage of a direct-current generator at the different predetermined values corresponding to different settings of the generator field controller.

An important object of my invention is to provide for maintaining a predetermined relation between the output current and voltage of a direct-current generator and the setting of the generator field controller.

A further object of my invention is to provide for automatically compensating for changes in the voltage of a generator above and below a predetermined desired value by applying a corrective action in the field structure of the generator as a function of the actual generator voltage and current and the current flowing through the control field winding of the generator.

Still another object of my invention is to provide for maintaining the voltage applied to the armature of a motor by the generator in a generator field or Ward-Leonard control system at different predetermined values corresponding to different settings of the generator field controller regardless of variable characteristics of the system which would otherwise affect the voltage applied to the motor, thereby maintaining different predetermined speeds of the motor corresponding to different controller settings.

Other objects of my invention will in part be obvious and in part appear hereinafter.

My invention accordingly is disclosed in the embodiment hereof shown in the accompanying drawings and comprises the features of construction, combination of elements and arrangement of parts which will be exemplified in the construction hereinafter set forth, and the scope of the application of which will be indicated in the appended claims.

For a more complete understanding of the nature and scope of my invention, reference may be had to the following detailed description taken in connection with the accompanying drawings, in which:

Figure 1 illustrates diagrammatically the arrangement of an elevator car in a hatchway;

Fig. 2 is a view, in side elevation, of a control relay used in practicing my invention;

Figs. 3 and 4 illustrate respectively, the arrangement of the armature and field windings of the generator and the regulator generator used in practicing my invention;

Figures 5, 5A:
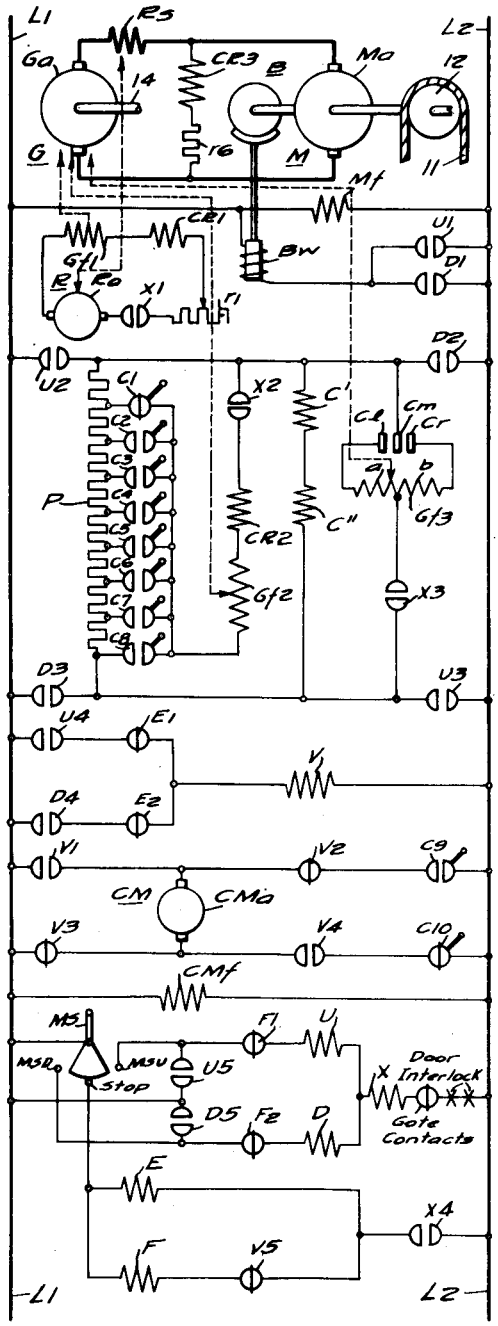
Fig. 5 illustrates diagrammatically the circuit connections which may be employed.
Fig. 5A illustrates the relationship between certain of the various operating windings and contact members of the relays and switches illustrated in Fig. 5.

According to my invention, I have provided means for controlling the operation of the generator of a generator field or Ward-Leonard control system, the motor of which is operatively connected to move an elevator car in a hatchway. The generator is provided with three field windings,—a control field winding, a compounding field winding, and a correcting field winding. The control field winding is arranged to be connected through a generator field controller to a control source. By varying the flow of current through the control field winding with the field controller, the voltage generated in the generator armature is varied and accordingly the voltage applied to the motor armature is varied. The current flowing through the compounding field winding is obtained from a regulator generator, the field winding of which is connected in series circuit relation with the loop circuit connecting the armatures of the motor and generator. Thus, the current flowing through the compounding field winding is a function of the loop circuit current. The correcting field winding is divided into two sections so that they may be connected to either increase or decrease the combined effects of the control and compounding field windings.

In order to maintain the voltage of the generator at a predetermined value regardless of variations in operating characteristics, a control relay is provided having three main operating windings. One of these windings, a current winding, is connected in series circuit relation with the compounding field winding and thus is responsive to the current flowing in the loop circuit. The relay is provided with another field winding, a control winding, which is connected in series circuit relation with the control field winding. The control relay is provided with a third winding, a voltage winding, which is connected across the loop circuit and thus is responsive to the voltage of the generator. The control relay is further provided with contact members which are arranged to selectively connect the corrective field winding to a source of control current. When the combined effects of the current and control windings predominate over the effect of the voltage winding, the contact members are operated to so connect the correcting field winding that a flux is generated which is additive to the effect of the control and compounding field windings. If the effect of the relay voltage winding predominates over the combined effects of the relay current and control winding, then the contact members are operated to so connect the correcting field winding that it will oppose the action of the control and compounding field windings with the result that the voltage generated by the generator will be decreased. The control relay is preferably of a sensitive type so that it may readily alternate between these two positions and thus maintain a predetermined relationship between the voltage applied to the loop circuit by the generator and the setting of the generator field controller.

Referring now particularly to Fig. 1 of the drawings, the reference character 10 designates generally an elevator car which may be supported in a hatchway or shaft by means of a cable 11 which is passed over a sheave 12 and balanced by suitable counterweights 13. The elevator car 10 is provided with a slowdown inductor switch E and a landing inductor switch F. The slowdown inductor switch E is provided with normally closed contact members E1 and E2, while the landing inductor switch F is provided with normally closed contact members F1 and F2. When the operating winding of the slowdown inductor switch E is energized, no action takes place until the contact members E1 or E2 come into proximity respectively with the inductor plates UE or DE depending upon the direction of travel of the elevator car. Assuming that the elevator car 10 is traveling upwardly and that the operating winding of the slowdown inductor switch E is energized, the contact members E1 will be opened as soon as they are moved into proximity with the inductor plate UE. A resulting control function then takes place which will be set forth in detail hereinafter. The contact members F1 and F2 of the landing inductor switch F are also opened when they come into proximity respectively with the inductor plates UF or DF. It will be understood that each floor is provided with a set of inductor plates so that the elevator car may be decelerated and stopped at each floor. It will also be observed that the elevator car is provided with a master switch MS having three positions, the extreme outer positions corresponding to up and down movement of the car and a central position to a position to stop the car.

In order to operate the elevator car 10 in the hatchway, a Ward-Leonard control system is provided which comprises a motor M that is arranged to be mechanically coupled, as illustrated, to the sheave 12. As shown in Fig. 5 of the drawings, the motor M comprises an armature $Ma$ and a motor field winding $Mf$, the latter being arranged to be separately excited from normally energized conductors L1 and L2. A brake B is provided having a brake releasing winding $Bw$ for releasing it on energization of the motor M.

The motor M is arranged to be energized by means of a generator G having, as shown in Figs. 3 and 5, an armature $Ga$, a compounding field winding $Gf1$, a control field winding $Gf2$, and a correcting field winding $Gf3$. The armature $Ga$ of the generator G is arranged to be mounted on a shaft 14 which may be driven by any suitable motive means, such as an induction motor, (not shown), that may be connected to an alternating-current source of supply.

In order to energize the compounding field winding $Gf1$, a regulator-generator R is provided having an armature $Ra$ which may be mounted on the shaft 14, as is shown in Fig. 1 of the drawings. The regulator-generator R is provided with a series field winding Rs which is connected in series circuit relation with the loop circuit connecting the armatures of the motor M and the generator G. The arrangement and connections of the armature Ra and the series field winding Rs of the regulator R are shown in Figs. 4 and 5 of the drawings. It will be understood that the current flowing through the compounding field winding G/1 will be a function of the current flowing in the loop circuit since the regulator-generator R is excited by the series field winding Rs.

In response to the operation of the master switch MS, up or down reversing switches U or D are operated depending upon the direction of movement of the master switch. On operation of either the up or the down switch, an auxiliary switch X is operated to prepare a circuit for energizing the operating windings of the inductor switches E and F. The auxiliary switch is also effective to complete certain control circuits which will be described hereinafter.

As soon as the up or down switch U or D is operated, a potentiometer P is connected between the conductors L1 and L2. The current flowing through the potentiometer P is in one direction when the up reversing switch U is energized and it flows in a reverse direction when the down reversing switch D is energized.

In order to accelerate the motor M, the current flowing through the control field winding G/2 is increased by increasing the voltage applied thereto from the potentiometer P. This voltage is gradually increased by the successive closure of contact members C2 through C8 which are arranged to be successively closed and opened by means of a control motor shown generally at CM. As shown, the control motor CM is provided with an armature CMa and a separately excited field winding CMf connected between the conductors L1 and L2. The direction of rotation of the control motor CM is controlled by means of a speed relay V which is energized on operation of either the up or down reversing switch U or D. In order to stop operation of the control motor CM after it has reached its limit of travel, contact members C9 and C10 are provided. The contact members C10 are arranged to remain in the closed positions, as illustrated in Fig. 5 of the drawings, until the control motor has reached its limit of travel after being initially energized, at which time contact members C8 are closed and full excitation is applied to the control field winding G/2. At this time, contact members C10 are opened to terminate further motion of the control motor CM in this direction. At the time that the control motor CM was initially energized, contact members C9 were closed. The contact members C9 are arranged to remain in the closed position until the control motor CM has been restored to the initial position, at which time they are opened. Since the details of construction of the control motor CM and the contact members C1 through C10 operated thereby form no part of this invention, a detailed description thereof will not be set forth herein. For a detailed description of the control motor CM and the functioning of the contact members C1 through C10 operated thereby, reference may be had to the Kenneth M. White Patent No. 2,069,510, issued February 2, 1937, and assigned to the assignee of this application.

It will be observed that the correcting field winding G/3 is provided with two sections a and b. The correcting field winding is arranged to be oppositely connected to the conductors L1 and L2 by means of a control relay CR, the construction of which is illustrated in Fig. 2 of the drawings, and the circuit connections of which are shown in Fig. 5 of the drawings. As shown in the drawings, the control relay CR comprises a frame 20 formed by two opposed E-shaped magnetic circuits 21 and 22. An arm 23 is mounted on the frame 20 and is pivoted at 24. It carries a contact member Cm which is arranged to engage the left-hand contact member Cl or the right-hand contact member Cr. The arm 23 is provided with moving coils C' and C'', which may be connected in series circuit relation and between the conductors L1 and L2 when either the up or the down reversing switch U or D is energized. It will be observed that the frame 21 has mounted therein a relay current winding CR1 and a relay control winding CR2, while the frame 22 has mounted therein a relay voltage winding CR3.

It will be recalled that the compounding field winding G/1 is connected in series circuit relation with the armature Ra of the regulator-generator R and that the field winding Rs of the regulator-generator R is connected in series circuit relation with the loop circuit. As illustrated in Fig. 5 of the drawings, the relay current winding CR1 is connected in series circuit relation with the compounding field winding G/1 so that the current flowing through this relay winding is a function of the current flowing in the loop circuit connecting the armature of the motor M and the generator G. The relay control winding CR2 is connected in series circuit relation with the control field winding G/2 of the generator G. The flux generated thereby is, therefore, a function of the current flowing through the control field winding G/2, and thus for every different setting of the potentiometer P, a different value of current flows through the relay control winding CR2. The relay voltage winding CR3 is connected through a resistor r6 across the loop circuit connecting the motor M and the generator G. The flux generated by this winding is then a function of the voltage generated in the armature Ga or the voltage which is applied to the armature of the motor Ma.

It will be understood that the combined effects of the relay windings CR1 and CR2 oppose the effect of the relay winding CR3. The contact member Cm assumes a position then, either in engagement with the contact members Cl or the contact members Cr or between them depending upon the relative energizations of the relay windings CR1, CR2 and CR3.

The contact members Cl and Cr have been illustrated as being connected to opposite ends of the correcting field winding G/3 or to the ends of the parts a and b, respectively. The center point of the correcting field winding G/3 is shown as being connected to one of the control conductors L1 or L2 depending upon the direction in which the elevator car is being operated. While this circuit arrangement has been illustrated for reversing the effect of the correcting field winding G/3 in the generator G by the control relay CR, it will be understood that circuits may be provided whereby the entire correcting field winding would be reversed rather than portions of it. Since such a circuit modification is well known to those skilled in the art, it has not been illustrated herein.

In operation, it will be assumed that the operator wishes to operate the elevator car 10 upwardly. Therefore, he operates the master switch MS to the up position. As a result, a circuit is completed for energizing the operating winding of the up reversing switch U. This circuit may be traced as follows:

L1, MS, MSU, F1, U, X, gate contacts, door interlocks, L2. At contact members U5, a holding circuit is completed for the operating winding of the up reversing switch U. The brake winding Bw is also energized, through a circuit which may be traced as follows:

L1, Bw, U1, L2.

At contact members X1, in response to operation of the auxiliary relay X, a circuit is completed for energizing the compounding field winding Gf1 as soon as current flows through the series field winding Rs of the regulator-generator R. The value of the current flowing through the compound field winding Gf1 may be varied by means of the rheostat r1, as will be readily understood.

Since the up reversing switch U was operated, the potentiometer P is connected between the conductors L1 and L2, through the following circuit:

L1, U2, P, U3, L2.

The control field winding Gf2 is then connected across the upper section of the potentiometer P through winding CR2 by contact members C1, it being recalled that contact members X2 are closed at this time since the auxiliary relay X is energized. A relatively low value of excitation will be applied to the field structure of the generator G by the control field winding Gf2 and current will flow through the loop circuit to energize the motor M. Since the brake B has been released, the car 10 will move upwardly.

A further result of the energization of the up reversing switch U is to energize the operating winding of the speed switch V. The energizing circuit for the latter winding may be traced as follows:

L1, U4, E1, V, L2.

The armature CMa of the control motor is now energized, through the following circuit:

L1, V1, CMa, V4, C10, L2, and the contact members C2 through C7 are successively closed and opened, contact members C1 being opened and contact members C8 being closed. As successive sections of the potentiometer P are cut out, the current flowing through the control field winding Gf2 is increased, so that the voltage which is generated by the armature Ga of the generator G is increased. Due to the increased voltage applied to the armature Ma of the motor M, the speed of the car in the up direction is increased. When the motor CM reaches the end of its travel, contact members C10 are opened and no further movement thereof takes place.

For each contact member C1 through C8 of the controller there is a definite speed at which the motor M should operate. Any departure from this speed may introduce undesirable operating characteristics which may cause the elevator to function in an unsatisfactory manner. It is, therefore, desirable for each of these contact members, or stated differently, for each setting of the controller, that the speed of the motor M be maintained at corresponding values. This action is obtained through the use of the control relay CR.

The control relay CR functions to apply a corrective action in the field structure of the generator G of such value and direction as to maintain the voltage which is applied to the armature Ma of the motor M at different values, each of which corresponds to a different setting of the controller. In the event that the pull exerted by the relay voltage winding CR3 exceeds the pull exerted by the combined effects of the current and control windings CR1 and CR2, which results from the voltage across the loop circuit being higher than the predetermined value corresponding to the particular setting of the controller, then contact members Cm will engage contact members Cr to connect the part b of the correcting field winding Gf3 across the conductors L1 and L2.

As shown by the arrows in Fig. 3 of the drawings, the flux generated by the part b of the correcting field winding Gf3 opposes the flux generated by the compounding and control field windings Gf1 and Gf2. The voltage generated by the armature Ga is therefore decreased. On being decreased to the proper value, the pull exerted by the relay voltage winding CR3 no longer exceeds that exerted by the current and control windings CR1 and CR2, and the contact member Cm moves out of engagement with the contact members Cr.

In like manner, if the voltage across the loop circuit is lower than the value which corresponds to the particular setting of the controller, then the pull exerted by the current and control windings CR1 and CR2 of the control relay CR is sufficient to overcome the pull exerted by the voltage winding CR3 and contact member Cm engages the contact member Cl. The part a of the correcting field winding Gf3 is then energized to generate a flux in the same direction as that generated by the compounding and control field windings Gf1 and Gf2.

It will be understood that the contact member Cm will be caused to vibrate rapidly by the engagement of the contact member Cl and the contact member Cr under normal operating conditions in order to provide the desired regulating effect. It will be observed that the voltage which is applied to the armature Ma of the motor M will then be unaffected by variable operating conditions in the generator G or in other controls as long as the variations from the normal or average conditions are within the limits for which the control relay CR is adapted to operate.

In order to stop the elevator car 10 at a floor, the operator centers the master switch MS, thereby completing an energizing circuit for the operating winding of the slowdown inductor switch E. This energizing circuit may be traced as follows:

L1, MS, STOP, E, X4, L2.

As soon as contact members E1 come into proximity with the up inductor plate UE corresponding to the floor at which it is desired to stop, they will be opened and the previously traced circuit for energizing the operating winding of the speed switch V will be opened. A circuit will then be completed for again energizing the armature CMa of the controller motor CM, this time in the opposite direction, through the following circuit:

L1, V3, CMa, V2, C9, L2.

Contact members C8 are then opened, contact members C7 through C2 are closed and opened successively, and contact members C1 are closed to decrease the current flowing through the control field winding Gf2. For each position of the controller, after various sections of the potentiometer P are connected in series circuit relation with the control field winding Gf2, the control relay CR will function to maintain the voltage across the loop circuit at correspondingly different values. In this manner, the speed of the elevator car 10 will be uniformly decreased so that the elevator car may be stopped at the desired floor with a minimum of delay and also with a minimum of discomfort to passengers carried thereby.

A further result of the deenergization of the speed switch V is to complete a circuit for energizing the operating winding of the stopping inductor switch F in parallel circuit relation with the operating winding of the slowdown inductor switch E. As contact members F1 come into proximity with the inductor plate UF, they are opened, and the previously traced holding circuit for the operating winding for the up reversing switch U is opened. As a result, the previously traced energizing circuit for the operating winding Bw of the brake B is opened and the brake B is applied. The potentiometer P is disconnected from the conductors L1 and L2, and since the voltage is no longer applied to the armature Ma of the motor M, and further since the brake has been applied, the elevator car 10 comes to rest at the desired floor.

Since certain changes may be made in the foregoing construction and different embodiments of the invention may be made without departing from the scope thereof, it is intended that all matter shown in the accompanying drawings or set forth in the foregoing description shall be interpreted as illustrative and not in a limiting sense.

I claim as my invention:

1. In a control system for a direct current generator, voltage-determining excitation means including means for varying a component of excitation of said generator independently of the operating condition of the generator and including compounding means responsive to the armature current of said generator for varying a component of excitation as a function of load, additional excitation means for said generator including correcting field winding means on said generator electrically independent of said voltage-determining excitation means, and relay means effective during changing conditions when the actual excitation of said generator is different from the final value determined by said voltage-determining excitation means for energizing said correcting field winding means to accelerate response of said generator, said relay means being effective to substantially deenergize said correcting field winding means when the actual excitation of said generator corresponds to the final value determined by said voltage-determining excitation means.

2. In a control system for a direct current generator, voltage-determining excitation means including means for varying a component of excitation of said generator independently of the operating condition of the generator and including compounding means responsive to the armature current of said generator for varying a component of excitation as a function of load, additional excitation means for said generator including a first correcting field winding on said generator for raising the excitation thereof and a second correcting field winding on said generator for lowering the excitation thereof, said first and second correcting field windings being electrically independent of said voltage-determining excitation means, and control means effective during changing conditions when the actual excitation of said generator is below the final value determined by said voltage-determining excitation means for energizing said first correcting field winding, said control means being effective when the actual excitation of said generator is above the final value determined by said voltage-determining excitation means for energizing said second correcting field winding.

3. In a control system for a direct current generator, voltage-determining excitation means including means for varying a component of excitation of said generator independently of the operating condition of the generator and including compounding means responsive to the armature current of said generator for varying a component of excitation as a function of load, additional excitation means for said generator including a first correcting field winding on said generator for raising the excitation thereof and a second correcting field winding on said generator for lowering the excitation thereof, said first and second correcting field windings being electrically independent of said voltage-determining excitation means, and control relay means effective during changing conditions when the actual excitation of said generator is below the final value determined by said voltage-determining excitation means for energizing said first correcting field winding, said control relay means being effective when the actual excitation of said generator is above the final value determined by said voltage-determining excitation means for energizing said second correcting field winding.

4. In a control system for a direct current generator, voltage-determining excitation means including means for varying a component of excitation of said generator independently of the operating condition of the generator and including compounding means responsive to the armature current of said generator for varying a component of excitation as a function of load, additional excitation means for said generator including a first correcting field winding on said generator for raising the excitation thereof and a second correcting field winding on said generator for lowering the excitation thereof, said first and second correcting field windings being electrically independent of said voltage-determining excitation means, and control relay means responsive to the operating condition of said first mentioned means, the armature current of said generator and the terminal voltage thereof for controlling said first correcting field winding and said second correcting field winding, said control relay means being effective during changing conditions when the actual excitation of said generator is below the final value determined by said voltage-determining excitation means for energizing said first correcting field winding, said control relay means being effective when the actual excitation of said generator is above the final value determined by said voltage-determining excitation means for energizing said second correcting field winding.

5. In a control system for a direct current generator, in combination, a control field winding in said generator, a controller for changing the flow of current through said control field winding, a compounding field winding in said generator disposed to be responsive to the output current of the generator, a two part correcting field winding in said generator, said parts being disposed to oppositely affect the voltage, and means for varying the effect of said correcting field winding, said last mentioned means being responsive to a function of the generator voltage and to a function of the current in said compounding field winding.

6. In a control system for a direct current generator, in combination, a direct current motor armature connected in loop circuit with the armature of said generator; a control field winding for said generator; a controller for changing the current flow through said control field winding, to thereby change the speed of said motor; a compounding field winding connected in said loop circuit disposed to be responsive to the current flowing through the armature of said generator, to modify the voltage of said generator; a correcting field winding for said generator operable to vary the voltage of said generator; and means responsive to the combined effect of the currents in said control field, said compounding field and to the voltage across said motor armature for varying the effect of said correcting field winding.

7. In a generator field control system, in combination, a direct current motor, a direct current generator, the armatures of said motor and generator being connected in loop circuit relation, a control field winding in said generator, circuit means for connecting said control field winding to a current source, a compounding field winding in said generator disposed to be responsive to the current flowing in said loop circuit, a two part correcting field winding in said generator, said parts being disposed to oppositely affect the generator voltage, and means for varying the effect of said correcting field winding as a function of the voltage across said loop circuit and of the current in said compounding field.

8. In a control system for a direct current generator, in combination, a control field winding in said generator, a controller for changing the flow of current through said control field winding, a compounding field winding in said generator disposed to be responsive to the current flowing through the armature of said generator, a correcting field winding in said generator, and control relay means disposed to be responsive to the currents flowing through said control and compounding field windings and to the generator voltage for varying the effect of said correcting field winding.

9. In a control system for a direct current generator, in combination, a control field winding in said generator, a controller for changing the flow of current through said control field winding, a compounding field winding in said generator disposed to be responsive to the output current of the generator, a two part correcting field winding in said generator, said parts being disposed to oppositely affect the generator voltage, and control relay means disposed to be responsive to the currents flowing through said control and compounding field windings and to the generator voltage for varying the effect of said correcting field winding.

10. In a generator field control system, in combination, a first dynamo-electric device operatively connected to a load, a second dynamo-electric device electrically connected to said first device, a control field winding in said second device, a controller for changing the flow of current through said control field winding, a compounding field winding in said second device disposed to be responsive to the current flowing between said devices, a correcting field winding in said second device, control relay means disposed to be responsive to the currents flowing through said control and compounding field windings and to the voltage across the circuit interconnecting said devices for varying the effect of said correcting field winding.

11. In a generator field control system, in combination, a direct current motor, a direct current generator, the armatures of said motor and generator being connected in loop circuit relation, a control field winding in said generator, circuit means for connecting said control field winding to a current source, a compounding field winding in said generator disposed to be responsive to the current flowing in said loop circuit, a two part correcting field winding in said generator, said parts being disposed to oppositely affect the generator voltage, and control relay means disposed to be responsive to the currents flowing through said control and compounding field windings and to the voltage across said loop circuit for varying the effect of said correcting field winding.

12. In a control system for a direct current generator, in combination, a control field winding in said generator, a controller for changing the flow of current through said control field winding, a compounding field winding in said generator disposed to be responsive to the current flowing through the armature of said generator, a correcting field winding in said generator, a control relay having contact members disposed to variably connect said correcting field winding to a current source, a control winding on said relay connected in series circuit relation with said control field winding, a current winding on said relay connected in series circuit relation with said compounding field winding, and a voltage winding on said relay connected to be responsive to the generator voltage.

13. In a control system for a direct current generator, in combination, a control field winding in said generator, a controller for changing the flow of current through said control field winding, a compounding field winding in said generator disposed to be responsive to the output current of the generator, a two part correcting field winding in said generator, said parts being disposed to oppositely affect the voltage generated by said generator, a control relay having contact members disposed to oppositely connect said correcting field winding to a current source, a control winding on said relay connected in series circuit relation with said control field winding, a current winding on said relay connected in series circuit relation with said compounding field winding, and a voltage winding on said relay connected to be responsive to the generator voltage.

14. In a generator field control system, in combination, a first dynamo-electric device operatively connected to a load, a second dynamo-electric device electrically connected to said first device, a control field winding in said second device, a controller for changing the flow of current through said control field winding, a compounding field winding in said second device disposed to be responsive to the current flowing between said devices, a correcting field winding in said second device, a control relay having contact members disposed to variably connect said correcting field winding to a current source, a control winding on said relay connected in series circuit relation with said control field winding, a current winding on said relay connected in series circuit relation with said compounding field winding, and a voltage winding on said relay connected across the circuit interconnecting said devices.

15. In a generator field control system, in combination, a direct current motor, a direct current generator, the armatures of said motor and generator being connected in loop circuit relation, a control field winding in said generator, circuit means for connecting said control field winding to a current source, a compounding field winding in said generator disposed to be responsive to the current flowing in said loop circuit, a two part correcting field winding in said generator, said parts being disposed to oppositely affect the generator voltage, a control relay having contact members disposed to oppositely connect said correcting field winding to a current source, a control winding on said relay connected in series circuit relation with said control field winding, a current winding on said relay connected in series circuit relation with said compounding field winding, and a voltage winding on said relay connected across said loop circuit, said voltage winding being disposed to operate said contact members in such manner as to energize one part of said correcting field winding to decrease the effect of said control and compounding field windings and said control and current windings being disposed to operate said contact members in such manner as to energize the other part of said correcting field winding to increase the effect of said control and compounding field windings.

WILLIAM F. EAMES.